Patented July 17, 1951

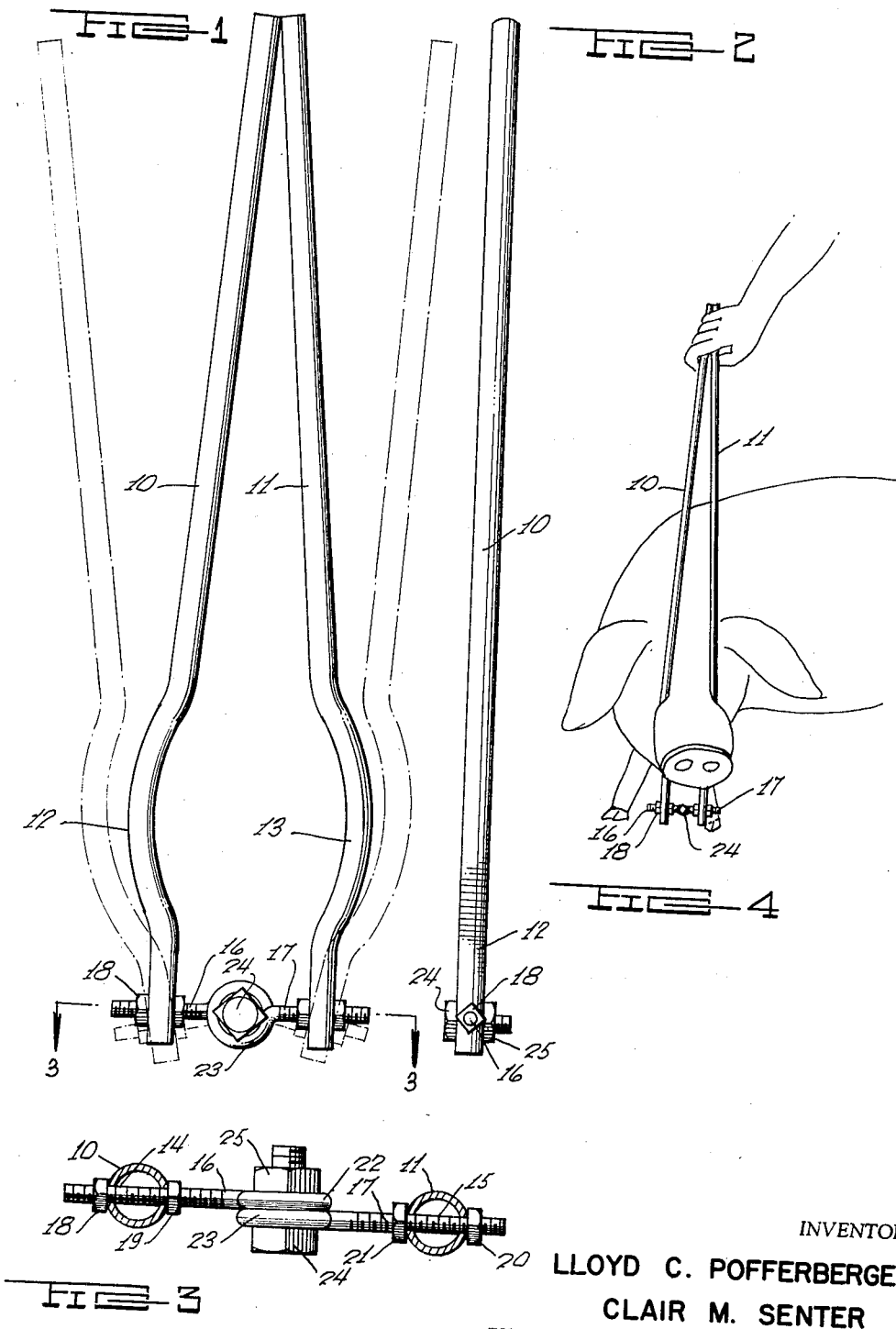

2,560,982

UNITED STATES PATENT OFFICE 2,560,982

ANIMAL HANDLING TONGS

Lloyd C. Pofferberger and Clair M. Senter, Maxwell, Iowa

Application October 11, 1949, Serial No. 120,648

1 Claim. (Cl. 119—154)

This invention relates to animal handling implements, and more particularly to a pair of tongs for catching and handling hogs.

It is among the objects of the invention to provide an improved implement for catching and holding hogs, which implement is in the form of a pair of tongs which can be easily slipped over the nose or snout of a hog and clamped firmly about the hog's jaws to restrain movement of the animal and hold its head in position for the insertion of nose rings, or for other purposes, which implement is adjustable to adapt it for use with hogs of different sizes, is smooth and rounded in construction, so that it does not injure the hogs caught thereby, has ample leverage to provide a substantially unbreakable grip on the snout or jaws of a hog, and is simple and durable in construction, economical to manufacture, and easy to use.

Other objects and advantages will become apparent from a consideration of the following description and the appended claim in conjunction with the accompanying drawing, wherein:

Figure 1 is a front elevation of an animal-handling implement, illustrative of the invention;

Figure 2 is a side elevation of the implement illustrated in Figure 1;

Figure 3 is a transverse cross-section on the line 3—3 of Figure 1; and

Figure 4 is a somewhat diagrammatic view showing the implement in use to hold a hog.

With continued reference to the drawing, the implement comprises a pair of elongated bars or handles 10 and 11, each of which has near one end an arcuately-curved or bowed portion, as indicated at 12 and 13, respectively. The two handles 10 and 11 are preferably of circular cross-sectional shape and tubular in construction to provide a large diameter consistent with adequate strength and light weight of the implement. These two handles have a length such that when the implement is secured on the snout or jaws of a hog, as illustrated in Figure 4, the handles will extend upwardly to a location in convenient reach of a person handling the hogs, a location of the upper end of the implement substantially at the waist level of the person, being desirable.

Each bar 10 and 11 is provided, between its bowed portion and the end adjacent which the bowed portion is provided, with a transverse aperture, as indicated at 14 and 15 in Figure 3, and screw eyes as indicated at 16 and 17 are respectively associated with the bars 10 and 11.

Each of the screw eyes 16 and 17 has an externally screw-threaded shank extending through the aperture in the corresponding bar, and a pair of nuts, as indicated at 18 and 19 for the screw eye 16, and 20 and 21 for the screw eye 17, are threaded onto the screw-threaded shanks with the two nuts on each shank disposed at respectively-opposite sides of the associated bar to adjustably secure the screw eyes in the bar. After the screw eyes are secured in the bars they are brought together so that their eyes 22 and 23 overlap, and a pivot bolt 24 is inserted through the overlapping eyes of the screw eyes and secured in operative assembly therewith by a nut 25 threaded onto the bolt.

The screw eyes are secured in the bars in such a manner that when the eye portions are overlapped and secured together by the bolt 24, the bowed portions 12 and 13 of the bars are outwardly-disposed relative to each other.

The curvature of the bowed portions 12 and 13 of the two bars and the length of the screw eyes 16 and 17 are such that the bowed portions will embracingly engage the jaws or snout of a hog. The implement may be adjusted for use with hogs of different sizes by threading the nuts 18, 19, 20 and 21 along the screw-eye shank to bring the pivotally-connected ends of the bars closer together or spread them further apart.

In using the device, the bars or handles 10 and 11 are held in upwardly-diverging relationship and the screw eyes are slipped under the nose or snout of a hog to be caught, this operation being facilitated by providing the hog with a small amount of food, and the handles are then brought together at their upper ends to firmly grip the nose or snout of the hog between the bowed portions of the handles or bars, whereupon the hog can be held by only a moderate force on the handles, as any action on the part of the hog to free himself will cause sufficient discomfort to limit such activity.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are therefore, intended to be embraced therein.

What is claimed is:

An animal-handling implement comprising a pair of elongated bars each having a bowed portion adjacent one end thereof and an aperture extending transversely therethrough between said bowed portion and said one end, a screw eye associated with each of said bars, each screw eye having a screw-threaded shank inserted through the aperture in the associated bar, nuts threaded on each screw-eye shank at respectively-opposite sides of the associated bar to adjustably secure the screw eyes to the bars, and a pivot bolt extending through the overlapping eyes of said screw eyes pivotally inter-connecting said bars with the bowed portions thereof outwardly-disposed relative to each other.

LLOYD C. POFFERBERGER.
CLAIR M. SENTER.

REFERENCES CITED

The following references are of record in the file of this patent:

UNITED STATES PATENTS

| Number | Name | Date |
| --- | --- | --- |
| 763,352 | Barton | June 28, 1904 |
| 930,796 | Quackenbush | Aug. 10, 1909 |
| 1,035,448 | Keys | Aug. 13, 1912 |
| 1,342,848 | Johnson | June 8, 1920 |
| 1,605,811 | Danielson | Nov. 2, 1926 |
| 1,778,507 | Burgin | Jan. 13, 1931 |